US012779954B2

(12) United States Patent
Avazpour

(10) Patent No.: US 12,779,954 B2
(45) Date of Patent: Nov. 3, 2026

(54) MY SUNDISK

(71) Applicant: Ardeshir Avazpour, Santa Clarita, CA (US)

(72) Inventor: Ardeshir Avazpour, Santa Clarita, CA (US)

( * ) Notice: Subject to any disclaimer, the term of this patent is extended or adjusted under 35 U.S.C. 154(b) by 612 days.

(21) Appl. No.: 18/445,171

(22) Filed: May 5, 2023

(65) Prior Publication Data

US 2024/0367492 A1 Nov. 7, 2024

(51) Int. Cl.
*B60J 3/02* (2006.01)

(52) U.S. Cl.
CPC .................................... *B60J 3/0208* (2013.01)

(58) Field of Classification Search
USPC ...................................... 296/97.1, 97.6, 97.9
See application file for complete search history.

(56) References Cited

U.S. PATENT DOCUMENTS 5,035,460 A * 7/1991 Huang ..................... B60J 11/08 160/370.21
5,116,273 A * 5/1992 Chan ...................... A45B 23/00 160/370.21
5,213,147 A * 5/1993 Zheng ..................... B60R 5/045 296/37.16
5,358,440 A * 10/1994 Zheng .................... A63H 33/18 446/487
5,711,570 A * 1/1998 Wu ........................ B60J 3/0208 296/97.8
6,869,127 B2 * 3/2005 Dohle ........................ B60J 1/08 160/90
7,059,650 B1 * 6/2006 Wood ....................... B60J 11/08 296/97.8
7,131,683 B1 * 11/2006 Gong ..................... B60J 1/2011 160/369
D537,764 S * 3/2007 Eskandry ...................... D12/183
7,393,041 B2 * 7/2008 Taqvi ..................... B60J 1/2011 160/DIG. 3

(Continued)

FOREIGN PATENT DOCUMENTS

DE 102009035075 A1 * 2/2011 ............ B60J 1/2011
DE 102017111671 A1 * 11/2018 ............ E06B 9/521

(Continued)

OTHER PUBLICATIONS

Translations of DE 102017111671 (Year: 2017).*
Translation of DE 102009035075 (Year: 2009).*

*Primary Examiner* — Amy R Weisberg
*Assistant Examiner* — Veronica M Condo
(74) *Attorney, Agent, or Firm* — Lambert Shortell & Connaughton; David J. Connaughton, Jr.; Justin P. Tinger

(57) ABSTRACT

To enhance a long driving experience during sunny days, an extension of the automobile's factory installed visor that can be moved back and forth on the window to block the glare of the sun from hitting the neck and the side of the face, while maintaining a safe partial view.
A movable automobile accessory that provides an extension of shade needed for undisturbed travel.
A disk that can roll along as needed to change shading with alternating sized holes on the edges that work with the rubber seal of the door providing a good grip. The tiny holes throughout My Sundisk with a diameter depth ratio of 1:3 or 1:4, block the sun at the high irritating angle without obstructing view.

6 Claims, 2 Drawing Sheets

(56) References Cited

U.S. PATENT DOCUMENTS

| | | | | | |
|---|---|---|---|---|---|
| 7,398,612 | B2 * | 7/2008 | Zheng | G09F 15/00 | 160/354 |
| 7,673,924 | B1 * | 3/2010 | Lau | B60J 11/08 | 296/95.1 |
| 7,823,953 | B2 * | 11/2010 | Haas | B60J 11/08 | 160/370.21 |
| 8,286,688 | B2 * | 10/2012 | Crozier | B60J 11/08 | 160/370.21 |
| 8,646,828 | B2 * | 2/2014 | Haase | B60J 1/2086 | 296/97.8 |
| 2004/0123961 | A1 * | 7/2004 | Huang | B60J 1/2091 | 160/370.21 |
| 2006/0000529 | A1 * | 1/2006 | Le | B60J 11/08 | 150/168 |
| 2009/0189409 | A1 * | 7/2009 | Porch | B60J 3/02 | 296/97.7 |
| 2012/0049562 | A1 * | 3/2012 | Mowder | B60J 1/2011 | 296/97.6 |
| 2013/0334837 | A1 * | 12/2013 | Serentill | B60J 1/2002 | 296/97.1 |

FOREIGN PATENT DOCUMENTS

| | | | | |
|---|---|---|---|---|
| WO | WO-9323262 | A1 * | 11/1993 | B60J 3/0286 |
| WO | WO-2007055434 | A1 * | 5/2007 | B60J 3/02 |
| WO | WO-2015074110 | A1 * | 5/2015 | B60J 3/0208 |

* cited by examiner

Front view

MY SUNDISK

BACKGROUND OF THE INVENTION

I was disturbed by the sun's burning and blinding effect while I was driving.

I was irritated by the lack of coverage by the factory installed visors.

I felt that more coverage was needed as a safety and comfort measure.

I began developing options and came up with different prototypes that both filtered and blocked the sun while ensuring a partial view.

BRIEF SUMMARY OF INVENTION

To solve the problem of the irritating glares, I came up with "My Sundisk".

My Sundisk is a revolutionary driving accessory with strategic tiny holes with a diameter to depth ration of 1:3 and 1:4 that blocks the sun's blinding rays at the higher intense angels while preserving partial view.

The disk can be placed and suspended on the window between the rubber seal and the body of the automobiles body and is easily moved or rolled along as needed.

A DETAILED DESCRIPTION OF INVENTION

A disk or sheet of material that can be slid between the rubber seal and the doors body of the automobile, specifically to block the sun blinding rays, as a movable extension of the visor.

A plastic disk of 25 cm diameter with 1 mm holes throughout the center with a diameter to depth ratio of 1:3 or 1:4, which function is to ensure that the sunlight at higher angles won't pass through, providing shade without obstruction of view.

The tapered rim of 2 cm at the edge has specially designed alternating holes of 3 mm and 6 mm with a 7 mm gap between that provides better grip while suspended at the window between the door's rubber seal and body of the automobile. The rounded and raised edges of the outside rim provides a better grip necessary for additional stability while held between the door seal and the body of the automobile.

Any surface or digital panel that can be placed between the door rubber seal of the window and the body of the automobile that can be used expressing moods, design, and advertising, that acts as a movable visor blocking the suns rays.

A BRIEF DESCRIPTION OF DRAWINGS

FIG. 1 Side view

Figure 1:
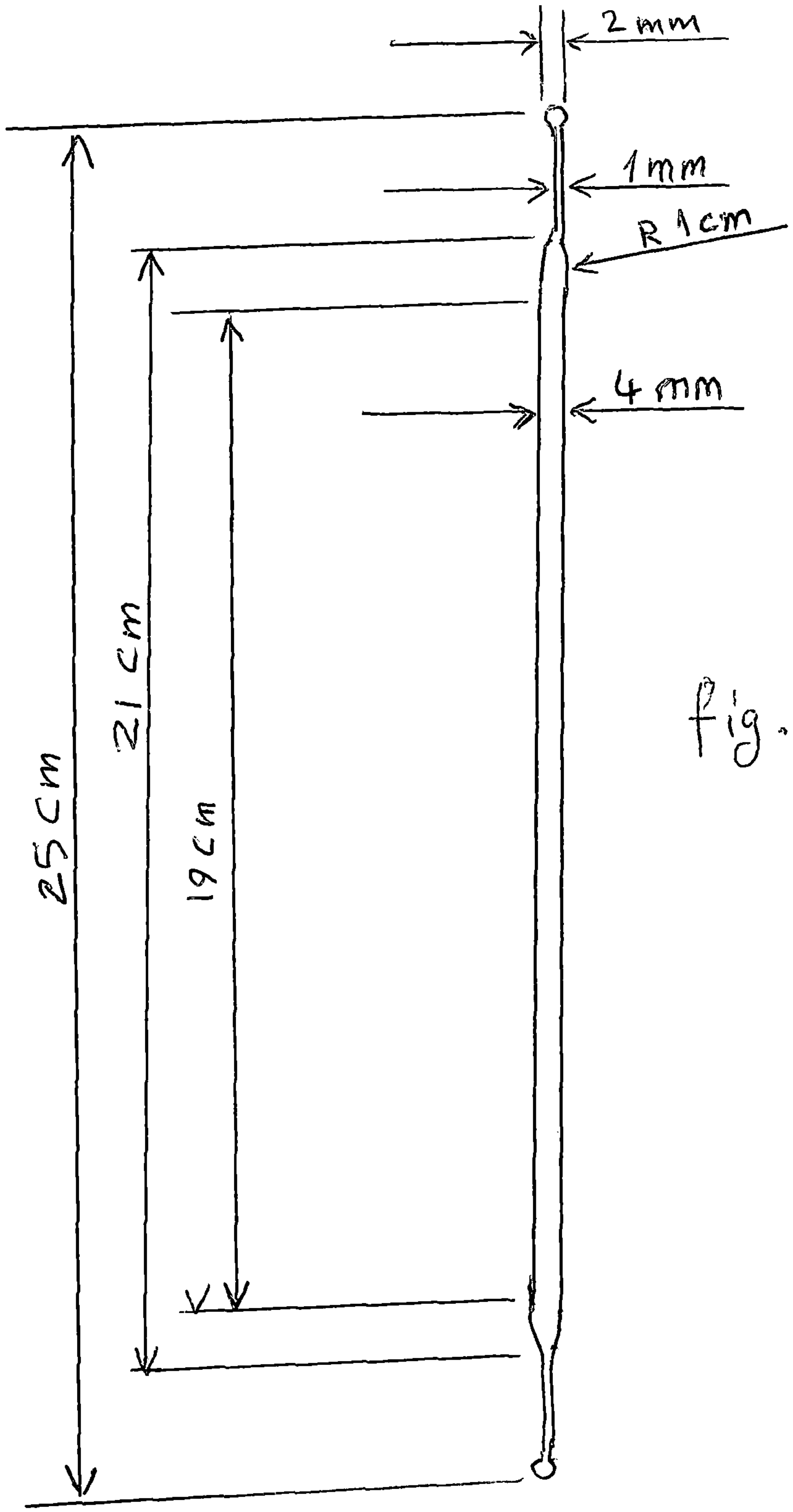
Figure 2:
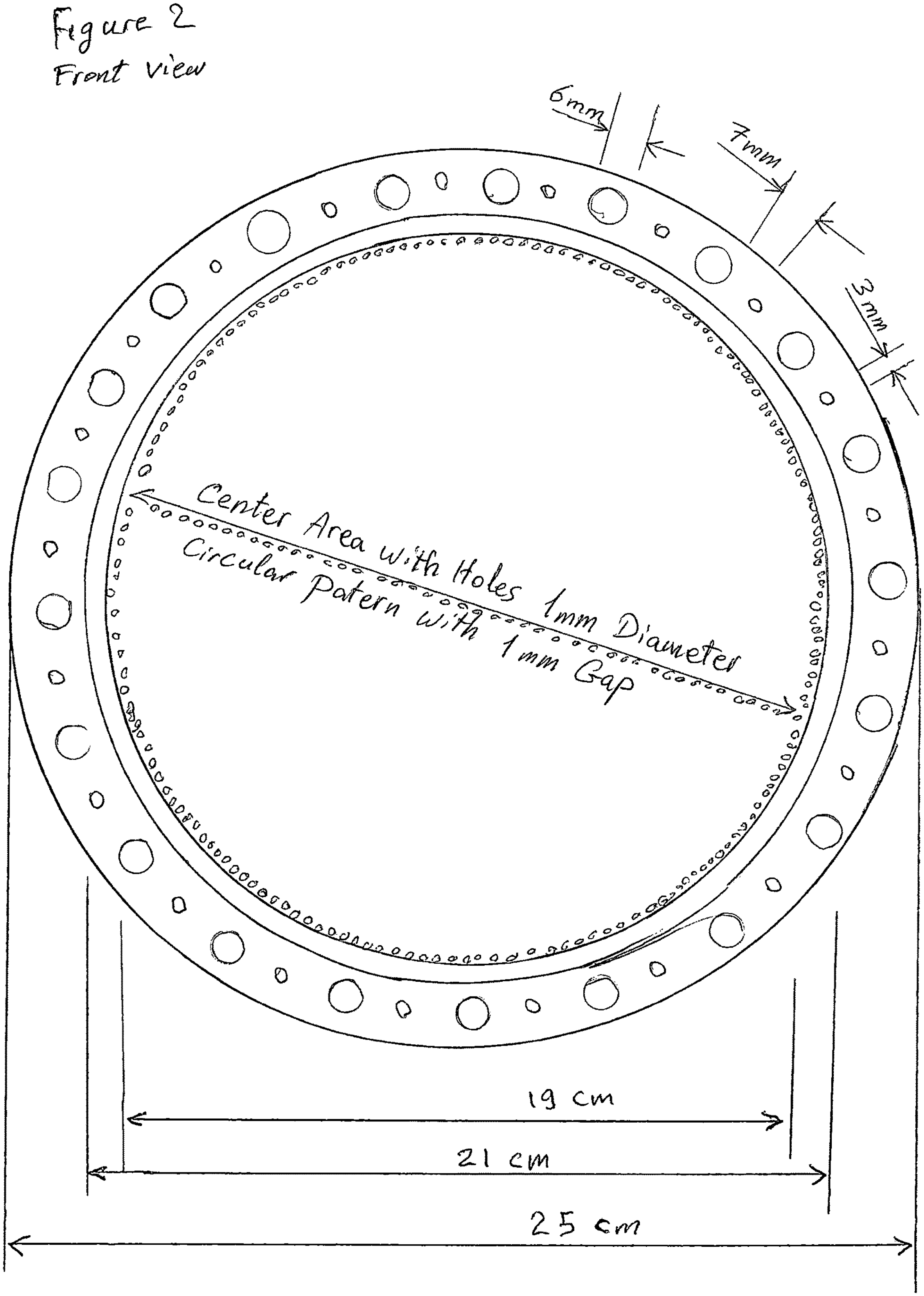

With rounded and raised edges of the outside rim, the disk stays tight in between car door rubber seal and the frame FIG. 2 Front view A plastic disk of 25 cm diameter with 1 mm holes throughout the center with a diameter to depth ratio of 1:3 or 1:4.

The tapered rim of 2 cm at the edge has specially designed alternating holes of 3 mm and 6 mm with a 7 mm gap between.

I claim:

1. A method for partially blocking sunlight in an automobile, comprising:

placing a rim of a sunshade between a rubber seal and a body of an automobile, causing the sunshade to be suspended at a window of the automobile;

wherein, the sunshade includes:

a circular disk, including:

the rim along a circumference of the circular disk;

wherein, the rim includes a first plurality of holes and a second plurality of holes;

wherein, the first and second plurality of holes are circular and have different diameters;

wherein the first and second plurality of holes are alternately placed along the rim at an interval;

wherein, the rim includes a raised and rounded edge along the circumference of the circular disk, and a circular recess inside the raised and rounded edge;

an inner circular portion inside the rim, including a third plurality of holes placed along a diameter and a circumference of the inner circular portion; and sliding the sunshade along the rubber seal of the automobile.

2. The method of claim 1, wherein the third plurality of holes has a diameter to depth ratio of 1:3 to 1:4.

3. The method of claim 1, wherein the first plurality of holes has a diameter of 3 mm, the second plurality of holes has a diameter of 6 mm, with 7 mm gaps in between each two adjacent holes from the first plurality of holes and the second plurality of holes.

4. A method for partially blocking sunlight in an automobile, comprising:

placing a rim of a sunshade between a rubber seal and a body of an automobile, causing the sunshade to be suspended at a window of the automobile;

wherein, the sunshade includes:

a circular disk, including:

the rim along a circumference of the circular disk;

wherein, the rim includes a first plurality of holes and a second plurality of holes;

wherein, the first and second plurality of holes are circular and have different diameters;

wherein the first and second plurality of holes are alternately placed along the rim at an interval;

wherein, the rim includes a raised and rounded edge along the circumference of the circular disk, and a circular recess inside the raised and rounded edge;

an inner circular portion inside the rim, including a third plurality of holes placed along a diameter and a circumference of the inner circular portion; and rolling the sunshade along the rubber seal of the automobile, with respect to a center of the circular disk.

5. The method of claim 4, wherein the third plurality of holes has a diameter to depth ratio of 1:3 to 1:4.

6. The method of claim 4, wherein the first plurality of holes has a diameter of 3 mm, the second plurality of holes has a diameter of 6 mm, with 7 mm gaps in between each two adjacent holes from the first plurality of holes and the second plurality of holes.

* * * * *